April 5, 1949.  A. E. GEE  2,466,225

ASTROLABE

Filed May 18, 1944  2 Sheets-Sheet 1

INVENTOR.
ALAN E. GEE
BY
ATTORNEY.

April 5, 1949.  A. E. GEE  2,466,225
ASTROLABE

Filed May 18, 1944  2 Sheets-Sheet 2

INVENTOR.
ALAN E. GEE
BY
ATTORNEY.

Patented Apr. 5, 1949

2,466,225

UNITED STATES PATENT OFFICE 2,466,225

ASTROLABE

Alan E. Gee, Golden, Colo., assignor of three-fifths to Arthur D. Quaintance, Golden, Colo.

Application May 18, 1944, Serial No. 536,159

5 Claims. (Cl. 33—1)

This invention relates to the art and practice of navigation relative to the earth's surface, and more particularly to the determination of an observer's position in terms of latitude and longitude through visual reference to a pair of celestial bodies, such as stars or planets, and has as an object to provide an improved device operable to conveniently and accurately translate the data of observation into terms of the observer's position with a minimum of reference to tables and extraneous data and without the necessity for involved computation.

A further object of the invention is to provide a compact and convenient device whereby known and observed data pertaining to a pair of celestial bodies may be immediately translated into terms of the observer's position relative to the earth's surface.

A further object of the invention is to provide an improved device for mechanically solving the navigational problem of determining an observer's position relative to the earth's surface through known and tabulated data relative to a pair of celestial bodies supplemented by observation of the altitude of said bodies.

A further object of the invention is to provide a mechanical device that accurately portrays the relationships between latitude, longitude, right ascension and declination, altitude, and azimuth as they appear in the navigation problem, and thus to provide a valuable training aid for student navigators.

With the foregoing and other objects in view, my invention consists in the construction, arrangement, and combination of elements hereinafter set forth, pointed out in my claims, and illustrated by the accompanying drawings, in which—

Figure 1:
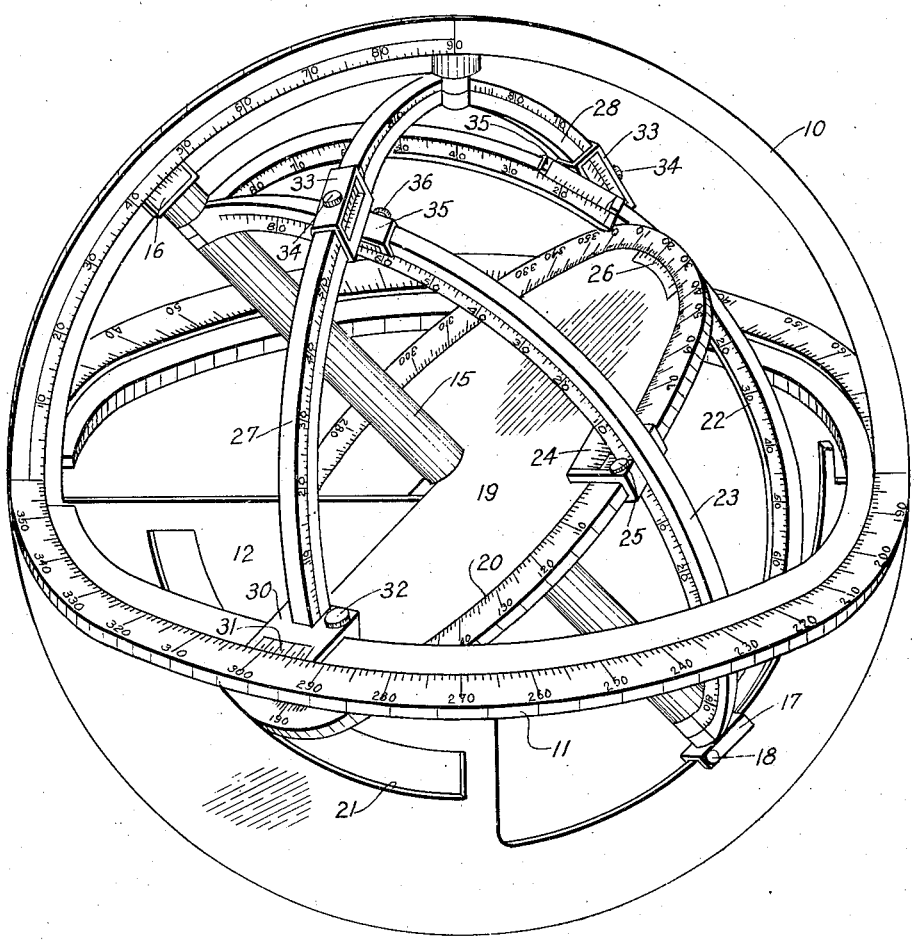
Figure 2:
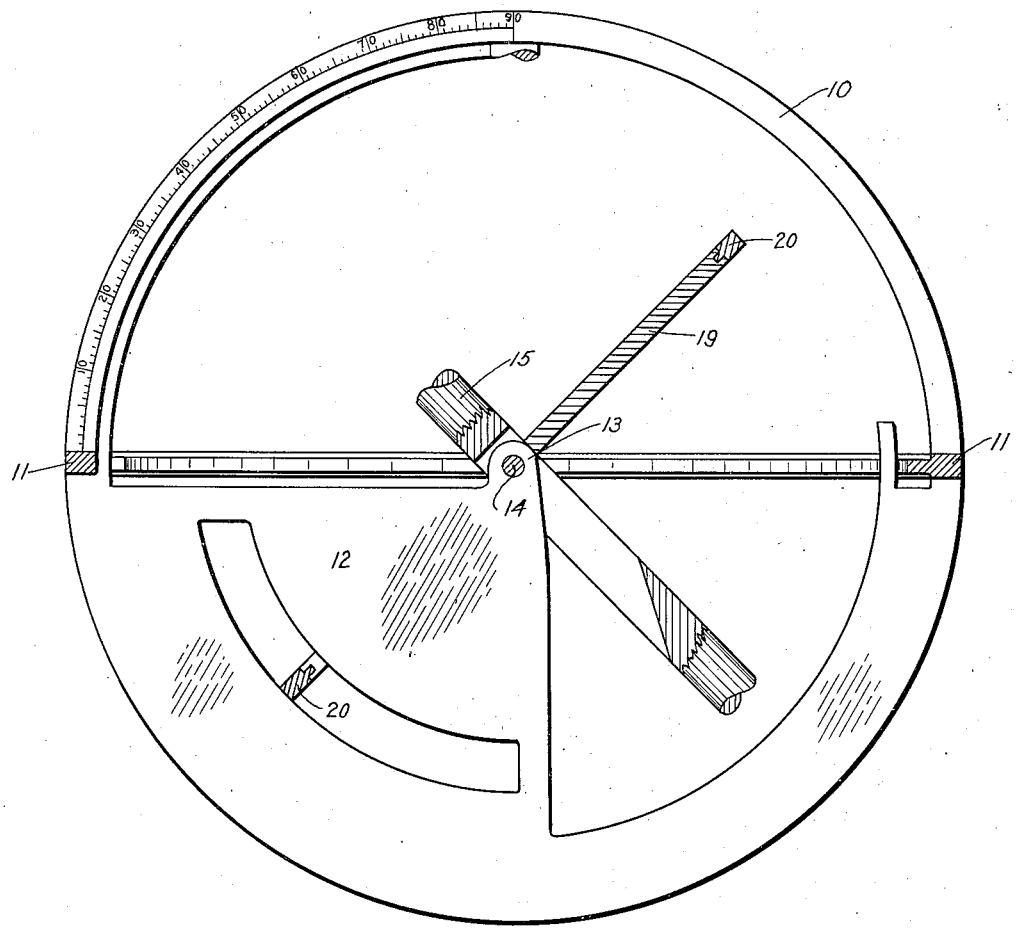
Figures 3, 4:
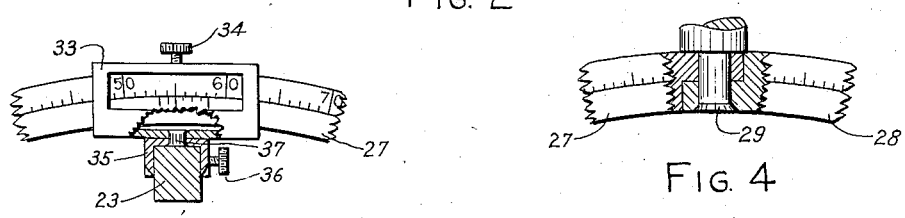

Figure 1 is a somewhat diagrammatic perspective view of the improved device as constructed and assembled for practical use. Figure 2 is a cross section taken vertically and substantially axially through the device shown in Figure 1, certain portions being omitted for greater clarity of illustration. Figure 3 is a fragmentary, detail view, partly in section and on an enlarged scale, through slidable swiveled connections of functional importance in the device shown in Figure 1. Figure 4 is a fragmentary, detail view, partly in section and on an enlarged scale, illustrating a typical hinge connection employed in the improvement.

In the art of navigation, whether terrestrial, nautical, or aerial, determination of position through observation of celestial bodies has long been known and practiced. Various solutions for the determination of position problem, respectively involving observations of various stars and planets and reference to various compilations of known astronomical data, are presently in use. One of the convenient solutions of the problem is predicated on substantially simultaneous observation and reading of the altitudes of two well separated stars or planets, supplemented by tabulated data as to the declinations and difference in right ascension of the observed bodies at the time of their observation. This solution of the navigational problem is not new, but as heretofore practiced it has involved somewhat intricate computations, time-consuming and susceptible of error, and reference to data and tabulations not always conveniently available. To simplify and expedite the solution of the navigational problem, utilizing only the observations above noted and reference to a single standard compilation, such as the Nautical Almanac, the improved astrolabe or position-finder herein shown and described is designed for manipulation to give direct readings of latitude, longitude and heading, with little or no necessity for computation or arithmetical correction.

The improved device comprises a plurality of circles, some movable and some fixed, grouped about a common center and associated with a pivoted axial member and with each other in a compact, unitary assembly. As shown, two great circles or annular members 10 and 11, of approximately equal maximum diameters, are rigidly and permanently interconnected in perpendicular relation of their respective planes and with their centers coincident. The member 10 is a latitude circle and represents a plane bisecting the earth through the poles, while the member 11 is an azimuth circle and represents the plane of the observer's horizon. The mid-point of the upper limb of the circle 10 lies in a perpendicular to the plane of the circle 11 passing through the coincident centers of the circles 10 and 11, and said mid-point represents the zenith with respect to the observer's position, which latter position, in the use of the improved device, is taken to be at the common center of the circles 10 and 11. One quadrant of the latitude circle 10 is suitably graduated in degrees, reading from zero at the point of intersection of said circle with the azimuth circle to ninety at the mid or zenith point of the latitude circle upper limb, and the azimuth circle 11 is suitably graduated in degrees, reading from zero coincident with the zero of the latitude graduations through the full circle of three hundred and sixty degrees.

That portion of the latitude circle 10 directly beneath its graduated quadrant is formed as a quadrantal web 12 which is disposed in the plane of said circle and approaches an apex adjacent the center, said web being formed with an ear 13 centrally of the circle 10 and centrally and perpendicularly intersecting the plane of the circle 11. The ear 13 is formed with a hole intersecting its thickness and hence axially perpendicular to the plane of the circle 10 and web 12, the axis of said hole lying in the plane of the circle 11 and containing the common center of the circles 10 and 11, and said hole accommodates a pin 14 which operatively engages with, mounts and serves as a pivotal axis for a straight, rigid member 15 thus disposed diametrically and in the plane of the circle 10 to oscillate about the pin 14 in and through a limited arc perpendicular to the plane of the circle 11. The member 15 is so associated with the web 12 and ear 13 as to have a range of oscillation substantially coextensive with the graduated quadrant of the circle 10, a longitudinal slot axially intersecting said member 15 to receive the ear 13 and at times accommodate the margin of the web 12 perpendicular to the plane of the circle 11 and a disposition of the other margin of said web in a plane offset somewhat below that of the circle 11 serving to mount said member 13 to provide the desired range of oscillation. The inner, arcuate margin of the graduated quadrant of the circle 10 is formed as a track wherewith a frame 16 fixed to the adjacent end of the member 15 slidably engages, said frame 16 carrying a vernier scale cooperating with and readable against the graduations of the associated quadrant to accurately determine, in terms of degrees and fractions thereof, the angular relation between the axis of the member 15 and the plane of the circle 11. The quadrant of the circle 10 adjacent the other end of the member 15 preferably has a width somewhat greater than that of the circle 11 and an inner margin formed as an arcuate track which extends at one end past and upwardly beyond the plane of the circle 11 for slidable cooperation with a shoe 17 fixedly carried by the proximate end of said member 15, said shoe 17, or the frame 16, or both, being provided with suitable means, such as a thumb screw 18, whereby the member 15 may be clamped and held relative to the circle 10.

The member 15 typifies the polar axis, and said member carries a circular plate 19 fixedly and perpendicularly associated therewith and radiating therefrom in a plane passing through the coincident centers of the circles 10 and 11, said plate 19 being radially slotted to accommodate and closely embrace the web 12 and being thereby mounted to move in maintained perpendicular relation with the member 15. The plate 19 has a diameter less than the inner diameter of the circle 11 and peripherally mounts and slidably engages, as by means of a tongue and groove joint, with an annulus 20 thereby mounted in the plane of, for oscillation with, and for full circle rotation about said plate 19, the annulus 20 intersecting the web 12 through an arcuate slot 21 formed for its accommodation in said web. The plate 19 and annulus 20 represent the plane of the celestial equator, and the upper face of said annulus is divided by means of suitable graduations into a full circle reading of three hundred and sixty degrees.

Hinged at their opposite ends to the member 15 and thereby disposed in planes radially of said member, a pair of semicircular limbs 22 and 23 is mounted on the member 15 as a diameter with the centers of said limbs coincident with the common center of the circles 10 and 11. The limbs 22 and 23 define planes at all times perpendicular to that of the plate 19 and annulus 20 and are arranged to be moved toward and away from each other about the axis of the member 15 with their inner arcuate margins closely adjacent the periphery of the annulus 20, and said limbs are graduated in degrees of curvature with the zero point on each limb in the plane of the plate 19 containing the common center of the circles 10 and 11. The limb 22 is pinned or otherwise suitably fixed to the annulus 20 with the zero points of said limb and annulus in registration, so that said limb and annulus move together about the axis of the member 15 and the circumference of the plate 19, while the limb 23 is provided with a vernier plate or frame 24 fixed to and movable therewith in slidably embracing relation with the periphery of the annulus 20, said element 24 being provided with means, such as a thumb screw 25, whereby the limb 23 may be clamped to and in adjusted relation along said annulus. The plate 19 carries a vernier scale 26 on its margin in position to be read against the graduations of the annulus 20, and said scale 26 is preferably disposed with its zero point in the plane of the circle 10 containing the center common to the circles 10 and 11, so that the scale 26 may be employed to read the angle of separation between the planes of the limb 22 and circle 10, while the scale of the element 24 may be employed to read the angle of separation between the planes of the limbs 22 and 23.

The diameter of the limbs 22 and 23 is sufficiently less than the inner diameter of the circle 10 as to provide a space between outer margins of said limbs and the inner margin of the circle 10 wherein a pair of quadrantal arms 27 and 28 may be movably accommodated. The arms 27 and 28 are separately hinged at their adjacent ends to a stud or pin 29 fixed to and extending inwardly from the midpoint of the upper limb of the circle 10, said stud or pin 29 providing an axis perpendicular to the plane of the circle 11 and passing through the center common to the circles 10 and 11 about which the arms 27 and 28 may oscillate. The arms 27 and 28 arch over and in close adjacency with their respective limbs 23 and 22 to each terminate in the plane and adjacent the inner margin of the circle 11, and each of said arms fixedly carries a shoe 30 slidably embracing a track formed for such purpose on the inner margin of the circle 11, each of said shoes 30 being provided with a vernier scale 31 disposed to be read against the graduations of the circle 11 and having suitable means, such as a thumb screw 32, whereby the shoe 30 and associated arm may be clamped to and in adjusted relation along the circle 11. The arms 27 and 28 are graduated in degrees of arc reading from zero points coincident with the plane of the circle 11 containing the center common to the circles 10 and 11, and each of said arms 27 and 28 slidably carries a frame 33 equipped with a vernier scale readable against the graduations of its associated arm and suitable means, such as a thumb screw 34, for clamping the frame 33 to and in adjusted relation along its arm. Similarly, each of the limbs 22 and 23 carries a frame 35 slidable along the associated limb and provided with a vernier scale readable against the graduations of its limb and with means, such as a thumb screw 36, for clamping the frame to and in adjusted relation along its limb. The frame 33 carried by the arm 27 is connected with the frame 35 of the limb 23 by means of a close swivel joint whereof the axis 37 is disposed as a common radius of said arm and limb, the frames thus connected being free to rotate relative to each other during angular adjustment of the arm and limb, but being impelled to move together with consequent displacement of the associated arm or limb when either of the frames is adjusted on its mounting. The frames 33 and 35 of the arm 28 and limb 22 are correspondingly interconnected for simultaneous travel and for relative rotation about a radially-disposed axis.

The close swivel connections between the frames 33 and 35 represent the positions of the celestial bodies observed, the arms 27 and 28 read, by means of the scales carried by the frames 33, altitude of the observed bodies above the observer's horizon, the limbs 22 and 23 read, by means of the scales on the frames 35, declinations of the observed bodies with reference to the celestial equator, graduations of the annulus 20 read hour angles and difference in right ascension, and the scales 31 carried by the shoes 30 read against the graduations of the circle 11 for determination of azimuth of the observed bodies in the plane of the observer's horizon.

In the use of the improved device, two known stars or planets, preferably rather widely separated, are selected and their altitudes read by means of a sextant, octant, or other suitable instrument, and the Greenwich civil time noted. By reference to the Nautical Almanac, or other authoritative tabulation, the Greenwich hour angle of the easternmost observed body is determined. The declination of each observed body for the time of observation is read from the available reference and set off by means of the frames 35 on the corresponding limbs 22 and 23, and the frames clamped in the proper reading of declination. The difference of right ascension between the observed bodies, in degrees, is determined from the available reference and set off on the annulus 20 by moving the limb 23 relative to the limb 22 and the element 24 is clamped to the annulus 20 to preserve the adjusted relation between the limbs 22 and 23. The observed altitude of the westernmost star is set off along the arm 27 by means of the frame 33 on said arm, the limbs 22 and 23 and the annulus 20 moving about the axis of the member 15 and the shoes 30 of the arms 27 and 28 moving along the circle 11 during such operation, and the frame 33 is clamped on its adjusted relation with the arm 27. The final adjustment of the device involves moving the limb 22, with its now fixedly-associated elements, and the adjacent arm 28 until the scale of the frame 33 on the arm 28 reads the observed altitude of the easternmost body, during which operation the member 15, plate 19 and annulus 20, limbs 22 and 23, and arms 27 and 28 may all move, relative to the circles 10 and 11 and in certain instances relative to each other, until the elements of the device assume and portray a relationship corresponding with that actually existing between the observed bodies, the astronomical reference planes and axes, and the observer's horizon and meridian, whereupon the frame 33 is clamped in its adjusted position on the arm 28, the shoe 17 clamped to the circle 10 and the shoes 30 clamped to the circle 11, thus inhibiting relative movement of any element of the device during reading of the determinations indicated thereby.

Setting of the various elements of the device in the manner and to the indications above set forth fully solves the navigational problem, the observer's correct latitude being directly readable from the graduated quadrant of the circle 10 by means of the scale carried by the frame 16 on the member 15, and the correct hour angle of the easternmost observed body being read from the annulus 20 by means of the scale 26, determination of the observer's correct longitude requiring only addition of the Greenwich hour angle earlier obtained from the almanac to the hour angle read from the annulus.

When the improved device is employed in the manner above described for determination of the observer's position, no use is or need be made of the azimuth readings on the circle 11. However, after the elements of the device have been adjusted for solution of the navigational problem the scales of the shoes 30 read against the graduations of the circle 11 to give true azimuths of the observed bodies, and such readings may be advantageously combined with readings of the angles between heading of the observer's craft and the observed bodies for determination of course, correction of heading, and the like.

Refinement of structural detail has been omitted from the showing and description of the device, since the invention resides in the assembly and operative relationship of the elements rather than in the specific structural form and arrangement thereof, it being obvious that considerations of accuracy, precision and durability would require the exercise of high technical skill applied to quality materials, as well as the addition of precision aids, such as slow-motion tangential feed means associated with the vernier frames, shoes and members, to the extent justified by the contemplated use of the device.

In the foregoing discussion wherever mention has been made of circles with coincident centers it is to be understood that the reference is to circles whereof the axes pass through a common point. The actual planes of the graduated circle surfaces will be, in most constructions, removed from the planes actually passing through the center common to the circles by one-half the thickness of the structural members constituting the circles.

Since many changes, variations and modifications in the specific form, arrangement, and structural combination of the elements shown and described may be had without departing from the spirit of the invention, I wish to be understood as being limited solely by the scope of the appended claims, rather than by any details of the illustrative showing and foregoing description.

I claim as my invention:

1. An astrolabe comprising fixedly and perpendicularly related, concentric, annular members typifying latitude and azimuth circles, a stud fixed at the zenith point to and projecting inwardly and axially of the azimuth member from the latitude member, a pair of like, quadrantal arms hinged to said stud for independent angular adjustment within the latitude member arch span about the azimuth member axis in bridging relation between said stud and azimuth member and in slidable cooperation of their free ends with the inner margin of the latter member, a straight, polar axis simulating member hinged centrally of the latitude member for oscillation in the plane of the latter with its ends slidably cooperating with the inner margin thereof, a pair of like, semi-circular limbs hinged to said polar axis member for independent angular adjustment thereabout concentrically of and interiorly adjacent the quadrantal arm arch span, a circular, equatorial plate fixed perpendicularly to and at the hinge point of said polar axis member in marginally-spaced relation with and interiorly of the limb arch span orbit, an annulus rotatably carried circumferentially of said plate for peripheral cooperation with the limb arch span inner margins and fixedly engaging with one and slidably engaging with the other of said limbs, graduations in terms of arc on said latitude and azimuth members, quadrantal arms, limbs and annulus, means for selectively clamping adjustable elements of the assembly to their slidably-associated elements, and swivel-interconnected, relatively-rotatable, radially-aligned indicator frames slidably engaging each associated limb and quadrantal arm pair to adjustably manifest celestial body declination and observed celestial body altitude respectively thereon.

2. An astrolabe comprising fixedly and perpendicularly related, concentric, annular members typifying latitude and azimuth circles, a stud fixed at the zenith point to and projecting inwardly and axially of the azimuth member from the latitude member, a pair of like, quadrantal arms hinged to said stud for independent angular adjustment within the latitude member arch span about the azimuth member axis in bridging relation between said stud and azimuth member and in slidable cooperation of their free ends with the inner margin of the latter member, a quadrantal mounting web interiorly integral with and in the plane of said latitude member encompassing the center thereof, a straight, polar axis simulating member slotted to receive said web and hinged centrally of the latitude member thereto for limited oscillation in the plane of said member with its ends slidably cooperating with the inner margin thereof, a pair of like, semi-circular limbs hinged to said polar axis member for independent angular adjustment thereabout concentrically of and interiorly adjacent the quadrantal arm arch span, a circular, equatorial plate radially slotted to accommodate said web fixed perpendicularly to and at the hinge point of said polar axis member in marginally-spaced relation with and interiorly of the limb arch span orbit, an arcuate slot in said web co-operating with the adjacent plate margin, an annulus rotatably carried circumferentially of said plate and traversing said slot for peripheral cooperation with the limb arch span inner margins and fixedly engaging with one and slidably engaging with the other of said limbs, graduations in terms of arc on said latitude and azimuth members, quadrantal arms, limbs and annulus, means for selectively clamping adjustable elements of the assembly to their slidably-associated elements, and swivel-interconnected, relatively-rotatable, radially-aligned indicator frames slidably engaging each associated limb and quadrantal arm pair to adjustably manifest celestial body declination and observed celestial body altitude respectively thereon.

3. An astrolabe comprising fixedly and perpendicularly related, concentric, arcuately graduated, annular members typifying latitude and azimuth circles, annular slide tracks on inner margins of said members, a stud fixed at the zenith point to and projecting inwardly and axially of the azimuth member from the latitude member, a pair of like, graduated, quadrantal arms hinged to said stud for independent angular adjustment within the latitude member arch span about the azimuth member axis in bridging relation between said stud and azimuth member, shoes on the free ends of said arms in selectively-clampable, slidable cooperation with the azimuth member slide track, an indicator frame slidable along and selectively-clampable to each of said arms to manifest an observed celestial body altitude thereon, a straight, polar axis simulating member hinged centrally of the latitude member for limited oscillation in the plane thereof, shoes on the polar axis member ends in selectively-clampable, slidable cooperation with the latitude member slide track, a pair of like, graduated, semi-circular limbs hinged to said polar axis member in concentric relation with said latitude and azimuth members for independent angular adjustment about said polar member axis interiorly adjacent the quadrantal arm arch span, an indicator frame slidable along and selectively-clampable to each of said limbs to manifest celestial body declination thereon, swivel means operatively connecting the indicator frame of each said limb to and in relatively-rotatable, radially-aligned relation with the indicator frame of the corresponding quadrantal arm, a circular, equatorial plate fixed perpendicularly to said polar axis member at its center of oscillation in marginally-spaced relation with and interiorly of the limb arch span orbit, a graduated annulus rotatably carried circumferentially of said plate for peripheral cooperation with the limb arch span inner margins, a fixed connection between one of said limbs and said annulus, and a slidable, selectively clampable connection between said annulus and the other of said limbs.

4. In an astrolabe, a rigid, sphere-defining frame comprised of fixedly and perpendicularly related, concentric, annular members typifying latitude and azimuth circles, a pair of like, quadrantal arms hinged at corresponding ends to and at the zenith point of the latitude member for independent angular adjustment interiorly adjacent said member arch span in selectively-clampable, slidably-traversing association of their free ends with the said azimuth member, and an orbitally-spherical sub-assembly adjustable interiorly of said frame in operative correlation with said latitude member and quadrantal arms, said sub-assembly comprising a straight, polar axis simulating member hinged centrally and for limited oscillation in the plane of said latitude member in selectively-clampable, slidably-traversing association of its ends with the inner margin thereof, a circular, equatorial plate fixed perpendicular to and at the hinge point of said polar axis member, an annulus on and rotatably adjustable about the circumference of said plate, and a pair of like, semi-circular limbs hinged to and for independent, angular adjustment concentrically about said polar axis member between and for cooperation with adjacent spaced margins of said arms and annulus; together with means for selectively clamping said limbs to and in a desired angular spacing marginally of said annulus, graduations in terms of arc on said latitude and azimuth members, arms, annulus, and limbs, indicator frames slidable along and selectively clampable to said arms and limbs, and swivel means positively interconnecting the indicator frame of each limb to and in relatively-rotatable, radially-aligned relation with the indicator frame of one of said arms.

5. In an astrolabe having a rigid, sphere-defining frame comprised of fixedly and perpendicularly related, concentric, annular members typifying latitude and azimuth circles, a pair of like, quadrantal arms hinged at corresponding ends to and at the zenith point of the latitude member for independent angular adjustment interiorly adjacent said member arch span in selectively-clampable, slidably-traversing association of their free ends with the said azimuth member, and a sub-assembly comprised of a straight, polar axis simulating member, a circular, equatorial plate fixed to and at the operative center of said latter member, an annulus on and rotatably adjustable about the circumference of said plate, a pair of like, semi-circular limbs hinged to and for independent angular adjustment about said polar axis member concentric with and peripherally of said annulus, and means for selectively securing said limbs to and in a desired angular spacing marginally of said annulus, graduations in terms of arc on said latitude and azimuth members, arms, annulus, and limbs, and means for operatively mounting said sub-assembly interiorly and in correlation with the latitude member and quadrantal arms of said frame, said latter means comprising a quadrantal web interiorly integral with and in the plane of said latitude member encompassing the center thereof, a radial slot in said plate communicating with a longitudinal slot in said polar axis member for the reception and accommodation of said web, an arcuate slot in said web for the accommodation of said annulus, a hinge pin interconnecting the operative centers of said frame and sub-assembly as manifest on said web and polar axis member to dispose the latter diametrically and for limited oscillation in the plane of the latitude member, selectively-clampable, slidable connections between the polar axis member ends and inner margins of the latitude member, and relatively-rotatable, radially-aligned, selectively-clampable, paired indicator frames slidably linking each limb with one of said arms.

ALAN E. GEE.

REFERENCES CITED

The following references are of record in the file of this patent:

UNITED STATES PATENTS

| Number | Name | Date |
|---|---|---|
| 464,261 | Beehler | Dec. 1, 1891 |
| 1,338,730 | Huntington | May 4, 1920 |
| 1,512,856 | Nuschak | Oct. 21, 1924 |
| 2,151,970 | Hobbs | Mar. 28, 1939 |
| 2,183,765 | Coleman | Dec. 19, 1939 |

FOREIGN PATENTS

| Number | Country | Date |
|---|---|---|
| 946 | Great Britain | Apr. 3, 1866 |
| 150,125 | Great Britain | Sept. 2, 1920 |